UNITED STATES PATENT OFFICE.

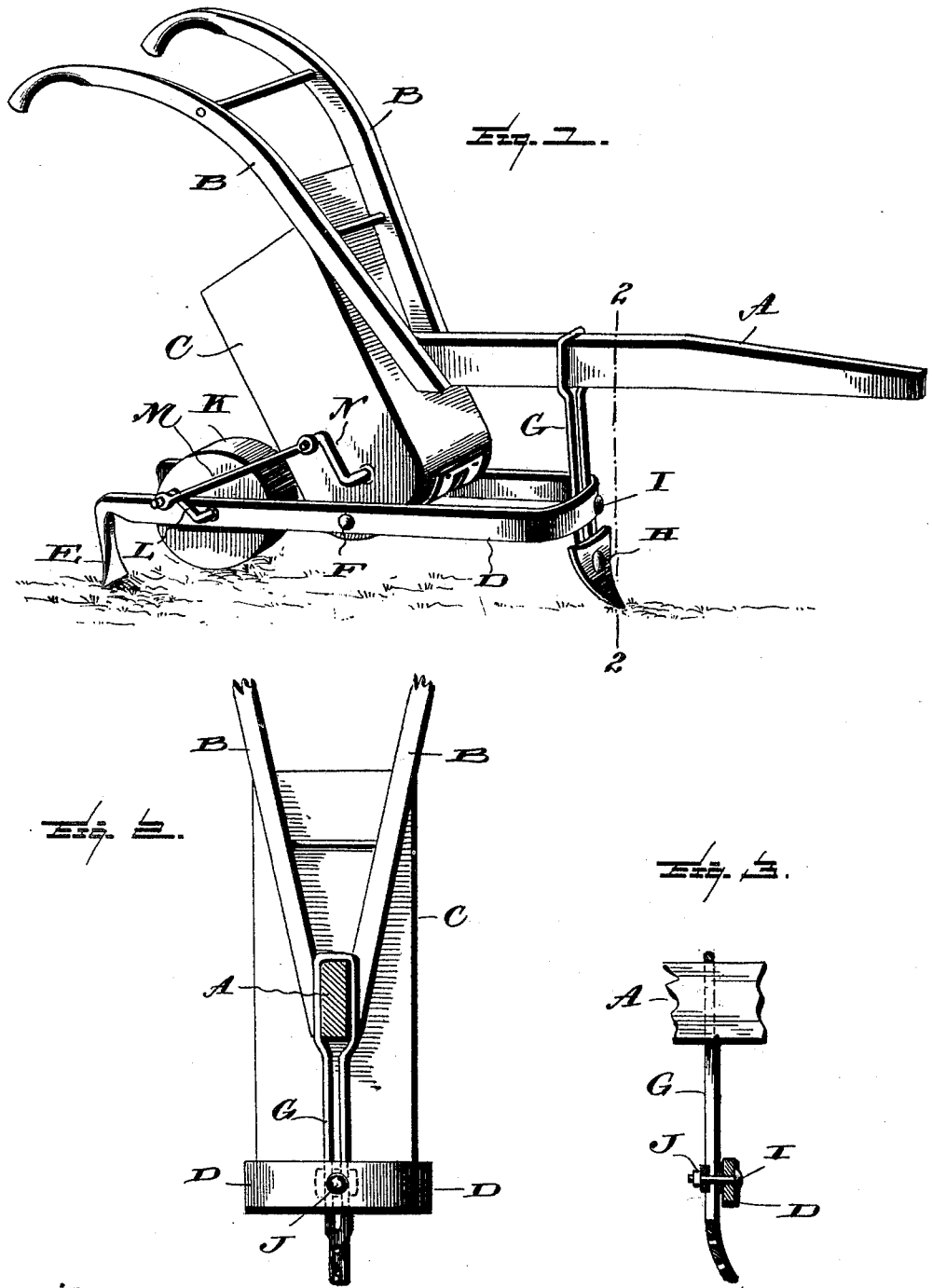

LEWIS JONES KING, OF FAIR PLAY, SOUTH CAROLINA.

PLOW AND SEED-DISTRIBUTER.

SPECIFICATION forming part of Letters Patent No. 581,594, dated April 27, 1897.

Application filed September 9, 1896. Serial No. 605,290. (No model.)

*To all whom it may concern:*

Be it known that I, LEWIS JONES KING, a citizen of the United States, residing at Fair Play, in the county of Oconee and State of South Carolina, have invented certain new and useful Improvements in a Combined Plow and Seed or Guano Distributer; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in combined harrows and seeders; and it has for its object the provision of a device of this character which will be simple and cheap in construction, efficient, and durable.

A further object of the present invention resides in the provision of a combined cultivator and seeder wherein a seed-chamber is provided in the rear of the plow or cultivator tooth and wherein provision is had for uniformly agitating the seed and insuring a free distribution of the same in the path of the plow and wherein the seed is effectually covered by means of a roller traveling in the rear of the seed-chamber.

Another and essential feature of the invention resides in the provision whereby the seed-chamber is pivoted within a frame, which frame is connected at its forward end to the standard of the plow or cultivator, means being provided whereby the forward end of the frame may be adjusted vertically upon said standard.

To these ends and to such others as the invention may pertain, the same consists in the peculiar construction and in the novel combination, arrangement, and adaptation of parts, all as more fully hereinafter described, and shown in the accompanying drawings, and then specifically defined in the appended claim.

The invention is clearly illustrated in the accompanying drawings, which, with the letters of reference marked thereon, form a part of this specification, and in which drawings—

Figure 1 is a perspective view of a combined seeder and plow or cultivator embodying my invention. Fig. 2 is a vertical section upon line 2 2 of Fig. 1. Fig. 3 is an enlarged sectional detail showing the means employed for adjusting the forward end of the frame upon the standard.

Reference now being had to the details of the drawings by letter, A designates the beam, and B B the handles, of a cotton cultivator or plow, the same being of the usual form of construction. To the rear of the beam and in contact with the rear end of the same is an inclined chamber or receptacle, also adapted to contain seed, guano, or other fertilizing material which it may be proposed to distribute in the path of the plow.

D is a frame, which is constructed of a single strip or piece of metal bent at its longitudinal center and having its rear ends bent downward at right angles to the body portion of the frame, the said downwardly-extended ends being fashioned into cultivator-teeth, as shown at E. The said frame D embraces between its longitudinal sides the lower end of the said chamber C, to which chamber it is secured by pin F, and at its forward end the said frame is detachably connected with the standard G of the plow H. The specific means which I preferably employ in securing this detachable connection with the standard is as follows: The standard G is constructed of a single piece of bar or round iron, which is at its longitudinal center bent so as to embrace and correspond in form with the plow-beam A, and at its lower end the said standard has bolted or otherwise secured thereto the plow-point H.

I is a bolt which is passed through an aperture formed in the forward end of the frame D and is extended through the space between the two vertical parallel portions of the standard, where it enters a plate or washer J upon the rear side of the standard. It will be seen at once that by this construction the forward end of the frame may be raised or lowered and may be secured at any point of adjustment that may be desired.

K is a traction wheel or roller which is suitably journaled within apertures formed in the side portions of the frame D, near the rear end of the frame. This roller travels directly in the rear of the seed-outlet of the chamber C and serves to cover the seed or fertilizing material that has been distributed from said chamber. The axle of the roller K is upon one side of the roller, extending through the side bar of the frame D and is bent to form a crank-arm L, which crank is connected, by means of a link M, with a crank N, connected with the agitator in the seed-chamber C.

It will be seen that by this construction a uniform agitation of the contents of the seed-chamber C is secured, and also that the action of the harrow-teeth E at the rear end of the frame D may be regulated by adjusting the connection of the forward end of the said frame with the plow-standard G.

Having thus described my invention, what I claim to be new, and desire to secure by Letters Patent, is—

The herein-described combination-harrow, or plow and seeder, the same consisting essentially in a plow-standard, handles, inclined seed-chamber at the rear of the plow-standard, said chamber being provided with an outlet and agitator, a roller, journaled in the rear of the seed-chamber, connections between said roller and the agitator, whereby the contents of the seed-chamber are automatically agitated, a plow-standard, consisting of a single piece of iron, bent at its longitudinal center, to embrace the plow-beam, and at its lower end carrying a plow-point, the frame D composed of a single piece of metal bent at its longitudinal center as described, and having its rear ends bent downward to form cultivator-teeth E, and the forward end of the frame being adjustably connected with the standard G, substantially as described and for the purpose specified.

In testimony whereof I affix my signature in presence of two witnesses.

LEWIS JONES KING.

Witnesses:
H. F. ALEXANDER,
J. A. F. HUTCHINS.